United States Patent [19]

Enright

[11] Patent Number: 5,012,864
[45] Date of Patent: May 7, 1991

[54] WELLHEAD APPARATUS INVOLVING A FREE FALL PLUNGER IN A WELL

[75] Inventor: David J. Enright, Lafayette, La.

[73] Assignee: Vernon E. Faulconer, Inc., Breaux Bridge, La.

[21] Appl. No.: 473,893

[22] Filed: Feb. 2, 1990

Related U.S. Application Data

[63] Continuation-in-part of Ser. No. 267,992, Nov. 7, 1988, Pat. No. 4,898,235.

[51] Int. Cl.5 .................. E21B 33/68; E21B 43/12
[52] U.S. Cl. ............................ 166/70; 166/95; 166/97
[58] Field of Search .............. 166/64, 95, 105, 70, 166/97, 153, 75.1, 252, 372, 311, 68; 417/57, 58

[56] References Cited

U.S. PATENT DOCUMENTS

| | | | |
|---|---|---|---|
| 3,031,971 | 5/1962 | Roach | 417/57 |
| 3,095,819 | 7/1963 | Brown et al. | 417/57 |
| 3,351,021 | 11/1967 | Moore, Jr. | 417/57 |
| 3,545,540 | 12/1970 | Waldron | 166/70 |

Primary Examiner—Ramon S. Britts
Assistant Examiner—Terry L. Melius
Attorney, Agent, or Firm—Gunn, Lee & Miller

[57] ABSTRACT

Wellhead production apparatus is set forth. It is adapted to be connected to a cased well having a production tubing string therein. It cooperates with a plunger traveling freely in the production tubing string. The wellhead apparatus connects typically through a flange at the wellhead, a master valve, a vertically extending tube which connects into and comprises a tee. The equipment extends thereabove so that the plunger can travel above the tee and is rebounded for reciprocation. The tee is formed of two cylindrical members which are arranged concentric of one another to define an annular flow space therebetween. The annular flow space being connected through an opening into a lateral production flow line. The tee thus cannot be blinded by stalling the plunger even with the lateral flow line.

11 Claims, 1 Drawing Sheet

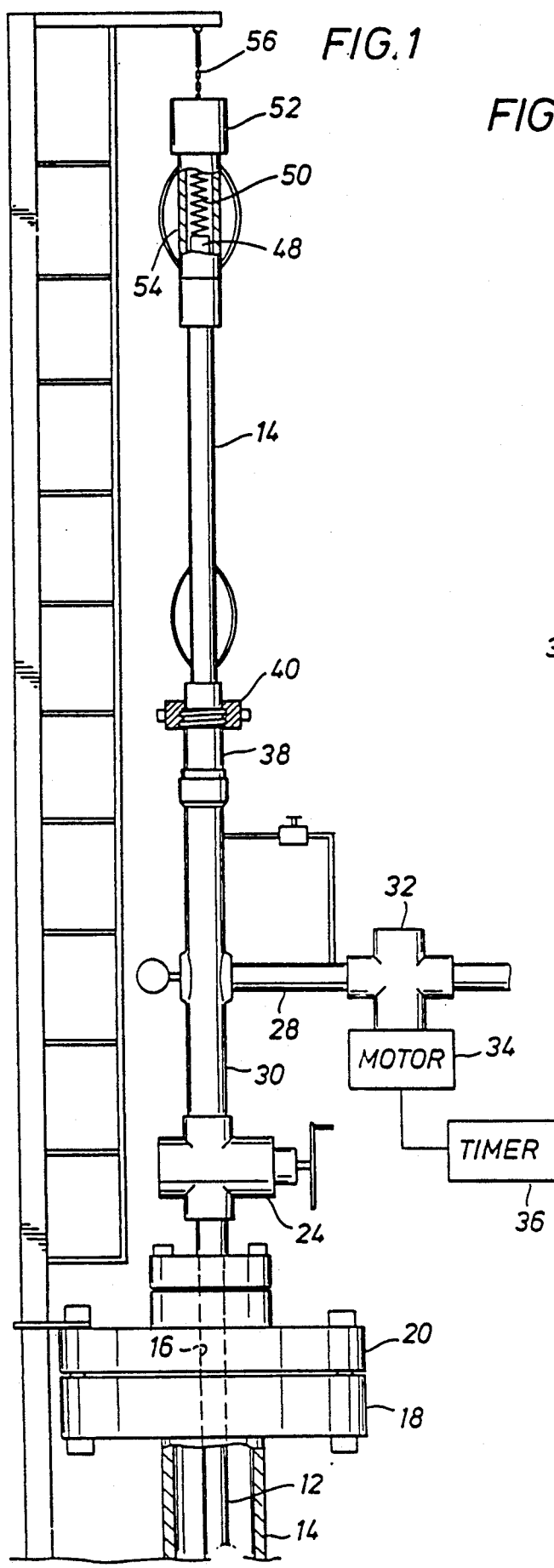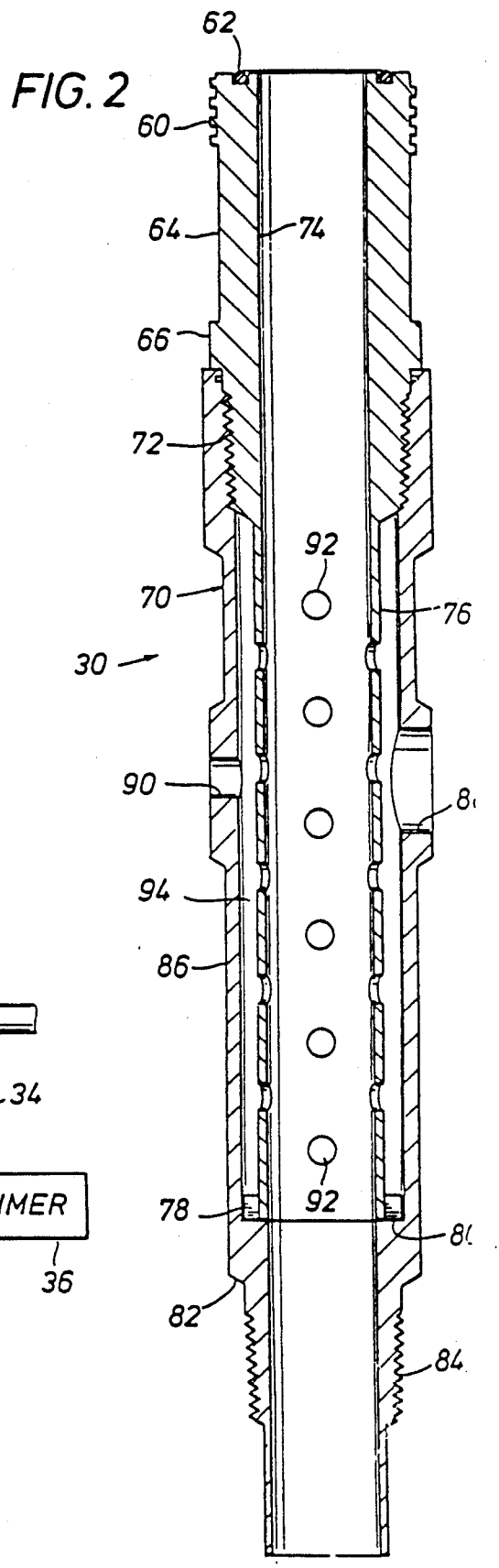

WELLHEAD APPARATUS INVOLVING A FREE FALL PLUNGER IN A WELL

BACKGROUND OF THE DISCLOSURE

The present disclosure is a continuation-in-part of U.S. Pat. No. 4,898,235 which issued on Feb. 6, 1990.

That disclosure sets forth an apparatus for use at the wellhead of a producing well where a free fall plunger reciprocates in the well to enhance production. It is especially useful in a well which is declining in performance. As set forth in that disclosure, when a well is first drilled, the production of the well will be relatively high and will decline with time thereafter. As the well declines, the internal pressure drive from the formation is reduced as formation depletion occurs. Ultimately, it is expedient to shift over to intermittent production as opposed to continuous production. In this instance, liquid slugs of the production fluid are normally delivered to the surface by a free fall plunger which travels in the production or tubing string. In very general terms, the foregoing disclosure describes a very successful procedure whereby a declining well can be produced for a longer period of time by means of intermittent production.

That disclosure sets forth a method of production and it also describes wellhead apparatus which is attached at a wellhead and which is serviced above the ground. This periodically receives the reciprocating plunger to enable reciprocating travel to and fro. The plunger is forced to the surface and enters the wellhead apparatus periodically. The wellhead apparatus described in that disclosure incorporates a transition tube which extends above a master valve. The master valve is supported above a flange connection which enables connection with the wellhead equipment. As the plunger moves upwardly, production fluid is forced up through the production tubing string and is diverted to the side through a tee which connects above the master valve. The tee extends to the side to carry away the production fluid. There is a continuation tube above the tee. It is typically suspended from overhead equipment so that the plunger can travel upwardly into it. It will be understood that the plunger is a type of guided projectile which travels at a speed dependent on a number of factors. At the top end of the equipment, there is a resilient means for intercepting the plunger when it strikes the very top end of the equipment. When that occurs, the plunger has traveled well above the tee to be intercepted at the top most end of the equipment where its energy is absorbed, and the plunger is then permitted to re-fall in the well to recycle and operate repetitively in the same fashion.

A regrettable problem arising with this type of equipment is that the fluid drive will continue to drop after the plunger and associated apparatus have been installed. There may be a circumstance in which the velocity of the plunger in upward travel is reduced trip after trip. As it is reduced, it ultimately reaches the point where the plunger may have sufficiently little momentum that it will not travel past the tee. When this occurs, it may well stall at the tee. There will be a downward force acting on the plunger as a result of its own weight while there is an approximately equal counterbalancing force resulting from the upward fluid drive. In that instance, the plunger may stall at the tee and partially or wholly block the tee. Instances have occurred where the plunger will either block the tee, stall where there is some flow through the tee or the plunger may oscillate at the tee. In all these instances, the optimum production rate which is envisioned from the plunger and associated equipment will be lost. That is, performance will be degraded in a serious fashion. Accordingly, the present apparatus is a modification in the equipment which enables the plunger to move into the tee, but stalling at this location is prevented. In other words, the plunger still operates in the intended fashion so that a slug can be delivered by the plunger through the tee for recovery, and plunger stalling which blocks the tee is prevented.

To better understand this mode of operation, the preferred embodiment sets forth a description of the equipment and its method of operation. Moreover, the problem will become more readily apparent on a review of the above referenced patent which sets forth the context in which the present difficulties arise, and makes more clear the solution which is provided by the structure of the present disclosure.

The present disclosure sets out a tee construction which is formed of concentric pipes through the tee. There is an inner concentric pipe which aligns with and connects to the transition tube therebelow so that a common diameter is presented. This commom tubing string diameter extends through the master valve and into the tee. There is a larger, outer concentric pipe positioned thereabout, the outer pipe serving as a structural member supporting the lateral port which opens from the tee. Moreover, the outer pipe serves as a nesting shoulder supported member about the inner pipe. The inner pipe is provided with sized perforations along the length of the pipe. These perforations flow to an annular space between the two pipes so that fluid production from the well is directed to the side. As the plunger rises past the perforations, the fluid drive will decrease. However, the number, spacing and diameter of the perforations provide an aggregate cross-sectional area flow to the side so that lateral flow of production from the well is diverted through the tee and delivered for disposition in the same fashion as set forth in the above referenced patent.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 is a side view of the wellhead apparatus positioned above a well and supported by a flange at the wellhead and further includes a master valve with a tee thereabove and an extension above the tee to serve as a continuation of the tubing string wherein the tee laterally directs liquids including condensate from the well borehole; and FIG. 2 is a lengthwise sectional view through the tee construction of the present disclosure showing first and second pipes, one being concentric within the other, wherein perforations in the concentric inner pipe direct fluid flow laterally into the lateral line from the tee.

DETAILED DESCRIPTION OF THE PREFERRED EMBODIMENT

Details of the structure of FIG. 1 are set forth in the above referenced parent patent. In general terms, that disclosure sets forth wellhead equipment which includes a transition tube which has an internal diameter sized to permit passage of a plunger and the transition tube guides the plunger for upward movement. The transition tube is a continuation of the tubing string 12 which is centered preferably within the casing 14. The tubing extension 16 serves as the machined surface which guides the plunger upwardly during its travel. There is a tubing spool 18, preferably fixed, at the top of the wellhead equipment and it enables connection with a hanger flange plate 20. These are joined by conventional bolts in the fashion well known in the art. A master valve 24 is normally open at all times except when it is necessary to shut in the well for service of equipment above the valve 24. The master valve has an internal diameter which is equal to or larger than the tubing extension 16. Preferably, it is sufficiently clear of the projected pathway of the plunger that the plunger moves freely through the master valve 24. The master valve is connected with a tee 30 thereabove. The tee opens into a lateral flow line 28 connected with a valve 32 which is in turn operated by a motor 34 which is timed in its operation by a timer 36. The timer provides a signal for the motor to operate to close the valve when flow from the well is not required, and the motor further operates to open the valve 32 so that flow can be delivered.

There is a sub 38 above the tee 30 and the sub in turn connects with a union nut 40 which is supported on the union sub to attach the sub to the apparatus. The nut 40 engages a pair of matching flanges which abut together. The union nut threads around the flanges to pull them tight. There is an extension tube 44 thereabove which permits the plunger, traveling as a rapid projectile to move upwardly past the lateral line 28, which reduces the fluid pressure drive behind the plunger. The plunger is ultimately intercepted by the means 48 suspended on the resilient spring 50 at the top end of the extension tube 44. This equipment is located in an elongate sleeve 54 joined to a threaded cap 52 and supported on a link chain 56 for pivotal movement. The foregoing equipment is better described in the above mentioned patent.

Attention is now directed to FIG. 2 of drawings of this disclosure. There, the tee 30 is shown in much better detail. It is made of two structural components which are joined together. Proceeding from the top, the upper end of this structure includes a set of threads 60 which enable threading to the extension tube 40 thereabove. This is typically accomplished with the sub 38 shown in FIG. 1 of the drawings. Moreover, a seal ring 62 is included for this. The threads 60 are formed on the exterior of the inner tubular member 64. It has an enlargement with a shoulder 66. This shoulder abuts the upper end of the outer tubular member 70. The outer tubular member 70 is provided with a set of internal threads at 72 which thread below the shoulder 66. These shoulders and threads which are constructed in accordance with oil field conventions. The inner tubular member 64 has an axial passage 74 which is sized to receive the plunger. This diameter is equal to the diameter of the transition tubing therebelow, and is equal to the diameter of the lubricator extension forming a plunger pathway through the equipment at the wellhead shown in FIG. 1. There is an elongate hollow extension 76 which extends below and which terminates at a set of protruding lugs 78 at the lower end. The tubular member 70 is axially hollow and has an upwardly facing shoulder 80. The tubular member 76 bottoms against the shoulder and registers against that shoulder. This provides a continuous path with a common diameter. There is an enlargement 82 just below the internal shoulder 80, and this enlargement connects to a threaded surface 84 therebelow for threading into the master valve, the two threads conforming to oil field standards. At the shoulder 80 an upstanding axially hollow sleeve 86 extends thereabove. The sleeve 86 terminates at an enlargement surrounding the threads 72. In addition, there is a lateral port 88 extending to the side. On the opposite side, there is a smaller lateral port 90. The port 90 is provided for easy connection with a pressure gauge or the like which is threaded in the smaller port 90. The larger port 88 connects with the lateral line 28 previously mentioned. This completes the construction of the tee so that a lateral flow path is provided.

Internally of the sleeve 76, there are a number of perforations 92 at spaced locations. The number is devised so that in conjunction with the cross/sectional area of each of the holes 92, a flow path to the side provided. In other words production from the well is directed upwardly through the tubular members shown in FIG. 2. The fluid flow propels the plunger upwardly. As it moves upwardly, it will uncover or expose the bottom most hole 92. This permits well fluid to flow into the annular space 94 which is between the two tubular members. There are multiple holes 92 and their cumulative cross-sectional area is such that more and more flow to the side is permitted as the plunger travels upwardly. Flow into the annular space 94 is drained through the tee into the opening 88 and then into the lateral line 28. This flow to the side is directed first through the annular space 94. In the aggregate, the several openings 92 are spaced so that the plunger is forced to travel upwardly until lateral flow sufficiently reduces the head of pressure provided by the well for moving the plunger upwardly. As will be observed in field installations, when the plunger is traveling upwardly, the lateral flow directs the fluid away, slows the plunger and directs the flow into the production line 28, and the plunger then slows. With the deployed holes 92 scattered along the length of the inner tubular member 76, it is not possible to blind all of them or to permit the plunger to stall where the lateral line 28 is plugged by the plunger. The positioning of the several holes at the locations exemplified in FIG. 2 assures that blinding of the tee does not occur. Rather, the upward movement of the plunger carries it sufficiently high relative to one or more of the flow holes 92 that adequate flow to the side is provided.

In operation, the present system discloses a tee which is installed in the structure of FIG. 1. This particular tee construction uses the annular space 94 to communicate one or more of the flow holes 92 so that well production fluid is diverted into the flow line 28. The spacing and number of the holes 92 can be varied. Likewise, the diameter of the holes can be varied. In summary, all of the holes are incorporated so that the fluid drive below the plunger is completely removed after the plunger clears the tee. In this manner, the annular space 94 can be taller, that is, it can extend above the lateral line 28. At that top most hole 92, any further movement of the plunger derives primarily from its momentum, not from fluid drive.

While the foregoing is directed to the preferred embodiment, the scope thereof is determined by the claims which follow.

What is claimed is:

1. Wellhead apparatus for attachment to a gas well in which a reciprocating plunger fitting in the tubing of the well repetitively travels along the production tubing string of the well to the wellhead wherein the wellhead apparatus comprises:
   (a) a plunger pathway communicating from a tubing string in a well wherein the pathway extends through
      (1) the tubing string of the well;
      (2) a transition tubing and a tee therein;
      (3) an extension thereabove;
   (b) a lateral production flow line connected with said tee for removing production from the well through said tee; and
   (c) said tee including
      (1) an inner hollow cylindrical member forming the plunger pathway,
      (2) an outer hollow cylindrical member surrounding the inner member and defining an annular flow space therebetween.
      (3) flow openings from said inner member into said annular space for directing flow of production fluids from the tubing string into the annular space, one or more of said flow openings being located below the flow line connection point, and
      (4) a lateral port connected to said lateral flow line.

2. The apparatus of claim 1 wherein said tee is formed of said first and second cylindrical tubular members concentrically about one another wherein said annular space is concentric therebetween, and including said flow openings in the smaller of the two concentric tubular members and said lateral port in the outer member for connection with the lateral flow line.

3. The apparatus of claim 1 wherein said inner member has two spaced ends and including an internal shoulder in said outer member conforming with and seating against one end of said inner member.

4. The apparatus of claim 1 wherein said inner member includes threaded means connecting to said outer member.

5. The apparatus of claim 4 wherein said inner member telescopes into said outer member sufficiently to abut an encircling registration shoulder.

6. The apparatus of claim 5 wherein said inner member and outer member comprise portions of the plunger pathway.

7. The apparatus of claim 5 wherein said inner member continues the plunger pathway and positions said flow openings in fluid communication with said pathway.

8. In a wellhead apparatus which connects with a well producing production fluid upwardly through a production tubing string which extends to the wellhead and wherein the wellhead apparatus connects with the tubing string and the tubing string encloses a reciprocating free fall plunger capable of rising and falling in the tubing string, an improved wellhead apparatus which comprises:
   (a) an extension tube for connection with a tubing string to define an upwardly directed plunger flow path sized to receive the plunger therethrough, and additionally for receiving fluid flow upwardly therethrough;
   (b) a tee serially connected in the wellhead apparatus for plunger travel therethrough wherein the tee has a cylindrical housing including a lateral port; and
   (c) a cylindrical member within said housing of said tee having diameter matching that of the tubing string to receive the plunger therethrough, and further including flow holes in the wall thereof wherein the flow holes open laterally for connection with an annular space and a production flow line connected with said tee, one or more of said flow holes being located below the connection between said annular space and said flow line.

9. The apparatus of claim 8 including an enlargement at the upper end of said inner member for connection to a surrounding support member.

10. The apparatus of claim 8 including first and second ports in a surrounding cylindrical outer member being concentric about a cylindrical inner member, said first port connecting with said production flow line, and said second port connecting to an instrument.

11. In a wellhead apparatus which connects with a well producing production fluid upwardly through a production tubing string which extends to the wellhead and wherein the wellhead apparatus connects with the tubing string and the tubing string encloses a reciprocating free fall plunger capable of rising and falling in the tubing string, an improved wellhead apparatus which comprises;
   (a) an extension tube for connection with a tubing string to define an upwardly directed plunger flow path sized to receive the plunger therethrough, and additionally for receiving fluid flow upwardly therethrough:
   (b) a tee serially connected in the wellhead apparatus for plunger travel therethrough wherein the tee has a cylindrical housing including a lateral port; and
   (c) a cylindrical member having two ends within said housing of said tee having diameter matching that of the tubing string to receive the plunger therethrough, and further including flow holes in the wall thereof wherein the flow holes open laterally for connection with an external elongate annular space and a production flow line which is connected with said tee, wherein said flow holes are located through said cylindrical member and are spaced along the length thereof.

* * * * *